(No Model.)

J. J. B. FREY.
PIPE COUPLING.

No. 260,968. Patented July 11, 1882.

WITNESSES:
C. Neveux
C. Sedgwick

INVENTOR:
J. J. B. Frey
BY Munn & Co
ATTORNEYS.

UNITED STATES PATENT OFFICE.

JOSEPH J. B. FREY, OF NEW YORK, N. Y.

PIPE-COUPLING.

SPECIFICATION forming part of Letters Patent No. 260,968, dated July 11, 1882.

Application filed June 9, 1882. (No model.)

*To all whom it may concern:*

Be it known that I, JOSEPH J. B. FREY, of the city, county, and State of New York, have invented a new and useful Improvement in Pipe-Couplings, of which the following is a full, clear, and exact description.

This invention has more particularly for its object the coupling of pipes and tubular connections of or from vessels or structures of various kinds in which, either from the peculiar construction of the pipes or owing to their attachment to the structures to which they pertain, it is difficult or impossible to apply the coupling by fitting it endwise over the pipe or pipes, also in which a close but soft or yielding connection between the pipes is desirable to avoid breakage and to make a close joint. Among other purposes or uses to which it will found applicable are the connections of pipes with the bowls of water-closets, wash-basins, urinals, the water-backs of ranges, and other structures.

The invention consists in a certain combination or combinations of parts, including a diametrically-divided and internally-flanged coupling-nut, a binding-nut to hold the divided portions of the coupling-nut together, pipes or pipe-sections, one of which is provided with an external collar and the other with a screw-thread, and a yielding washer arranged within the divided coupling-nut and between the ends of the connected pipes.

Reference is to be had to the accompanying drawings, forming part of this specification, in which similar letters of reference indicate corresponding parts in all the figures.

Figure 1:
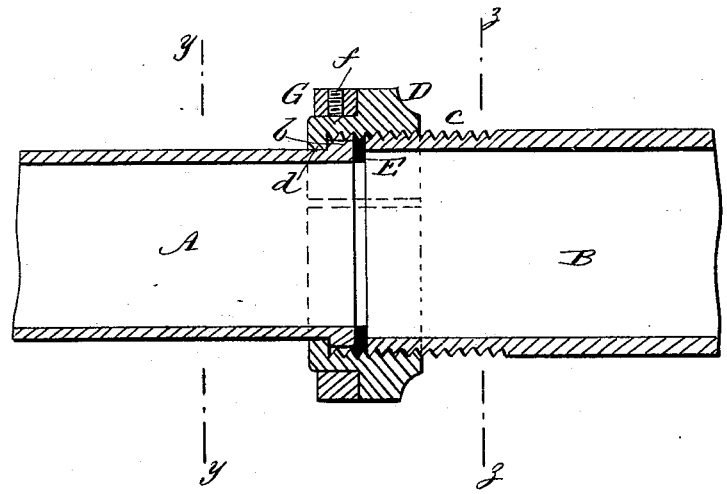
Figure 2:
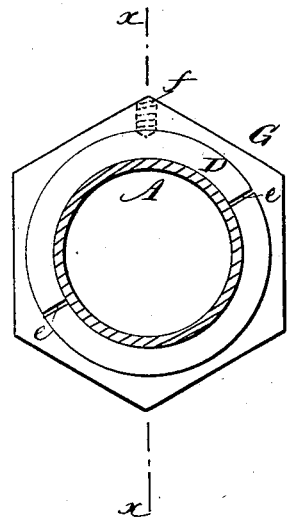

Figure 1 represents a longitudinal section on the line $x\,x$ in Fig. 2 of the adjacent end portions of two pipes having my improved coupling applied; Fig. 2, a transverse section on the line $y\,y$ in Fig. 1, and Fig. 3 a transverse section on the line $z\,z$ in Fig. 1.

A and B indicate the two pipes to be connected. The pipe A is constructed with an external collar, $b$, on its connecting end, and the pipe B has an external screw-thread, $c$, on its adjacent or connecting end. Said pipes are connected by a coupling-nut, D, which is constructed or provided on its one end with an internally-projecting flange, $d$, to receive the collar $b$ of the pipe A within it, and which nut has a female screw-thread that engages with the male thread on the end of the pipe B to draw the two pipes or pipe-sections A B together.

A leather, rubber, or other soft or flexible washer, E, is inserted in the coupling-nut D, to enter in between the adjacent ends of the pipes A and B, and thereby form a yielding packing, when screwing up the coupling, to prevent breakage and undue strain, as well as to produce a close joint.

Figure 3:
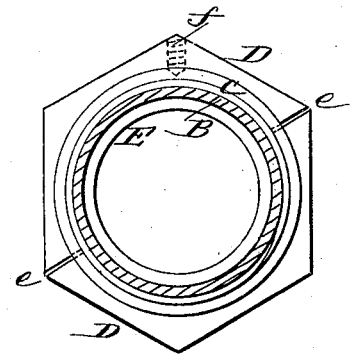

To provide for fitting the coupling-nut D to its place on the pipe A when it may not be convenient or practicable to do so by passing it in an endwise direction over the body of said pipe, either by reason of the shape of the pipe or its attachment to the vessel or structure to which it belongs, and by reason of the collar $b$ on said pipe and flange $d$ on the nut interfering with the passage of the nut over the outer end of the pipe, said coupling-nut D is divided diametrically, as shown at $e\,e$ in Fig. 3. This construction of the nut D in sections or halves provides for fitting it laterally to its place over the adjacent or connecting ends of the pipes A and B, after which, and either before or after screwing up the coupling, a binding-nut, G, is passed over a reduced or body portion of the divided coupling-nut D to hold its divided portions or sections together, and which, if necessary, may be secured on or to the coupling-nut by one or more set-screws, $f$, or otherwise. This binding-nut should be of such size internally as that it may be readily slipped endwise over the collar end of the pipe A before applying the divided coupling-nut laterally to the pipes or pipe-sections.

Having thus fully described my invention, what I claim as new, and desire to secure by Letters Patent, is—

1. The diametrically-divided coupling-nut D, provided with an internally-projecting flange, $d$, at or near its one end, in combination with the binding-nut G and the pipes or pipe-sections A B, the one of which has a collar, $b$, for engagement with the flange $d$ of the coupling-nut and the other of which has a screw-thread onto which said nut screws, substantially as specified.

2. The combination of the yielding washer E, the diametrically-divided coupling-nut D, having a flange, d, on its one end, the pipe A, with its external collar, b, the pipe B, having an external screw-thread, c, onto which said nut fits, and the binding-nut G, substantially as shown and described.

JO. J. B. FREY.

Witnesses:
A. GREGORY,
C. SEDGWICK.